3,377,394
METHYL FLUORIDE AND METHYLENE FLUORIDE PROCESS
Max M. Boudakian, Hamden, and Milton Lapkin, New Haven, Conn., and Eugene R. Shipkowski, Rochester, N.Y., assignors to Olin Mathieson Chemical Corporation, a corporation of Virginia
No Drawing. Filed July 15, 1966, Ser. No. 565,388
5 Claims. (Cl. 260—653)

ABSTRACT OF THE DISCLOSURE

Methyl fluoride and methylene fluoride are provided by reacting formaldehyde with hydrogen fluoride at a temperature between about 100° C. and 650° C. in the presence of a fluorine-containing inorganic acid, a metal fluoride, a metal oxide or a metal chromite.

---

This invention relates to a process for preparing partially fluorinated methanes. More specifically, it relates to an improved process for preparing methyl fluoride and methylene fluoride.

Partially fluorinated methanes have been previously prepared by a variety of methods. For example, it has been reported by F. Swarts, Bull. Soc. Chim. Belg., 46, 10 (1937), that the halogen exchange reaction between methyl iodide and mercurous fluoride provides methyl fluoride. However, it is well known that halogen-exchange reactions are commercially unattractive because of the formation of costly halide by-products.

Another process for preparing fluorinated methanes is described by E. H. Hadley and L. A. Bigelow, J. Am. Chem. Soc., 62, 3302 (1940), where it was reported that the fluorination of methane provides a mixture of fluorinated methanes, including methyl fluoride and methylene fluoride. The costliness of fluorine, together with the fact that the reaction is explosive unless carefully controlled, discourages feasible commercial utilization of this process. Thus, in summary, heretofore known processes for preparing methyl fluoride and methylene fluoride have been unattractive for a variety of reasons, including economic and safety considerations.

The aforementioned disadvantages have been eliminated in the process of this invention where it has been found that methyl fluoride and methylene fluoride can be conveniently and economically prepared in high purity and without the formation of costly by-products by reacting formaldehyde and hydrogen fluoride in the presence of a selected catalyst. This discovery is particularly surprising and unexpected since it is known that a mixture of fluoromethanol and bis(fluoromethyl) ether is obtained when paraformaldehyde and hydrogen fluoride are heated in the absence of a catalyst, as described, for example, by B. Weinmayr, J. Org. Chem. 28, 492 (1963).

Broadly, the process of this invention comprises heating formaldehyde and hydrogen fluoride in the presence of a reaction catalyst at a temperature between about 100° C. and 650° C. The term "formaldehyde" in the claims and specification herein includes formaldehyde monomer, trioxane and paraformaldehyde. Water and non-condensible gases are formed as by-products, and the desired fluorinated methanes are readily isolated by conventional techniques.

While a wide variety of reaction catalysts can be employed in the process of this invention, preferred embodiments utilize catalysts selected from the group consisting of fluorine-containing inorganic acids, metal fluorides, metal oxides and metal chromites.

Typical of the fluorine-containing inorganic acids are monofluorophosphoric acid, fluorosulfonic acid, difluorophosphoric acid and the like. Suitable metal fluorides include the alkali metal fluoride, such as potassium fluoride and cesium fluoride, and metal fluorides such as chromium trifluoride, mercurous fluoride, mercuric fluoride, aluminum fluoride, boron trifluoride, gallium trifluoride, antimony trifluoride, antimony pentafluoride, antimony chlorofluoride, chromium oxyfluoride, argentous fluoride, argentic fluoride, cobaltic fluoride, etc. Exemplificative of the metal oxides are lead oxide, lead dioxide, alumina, chromium oxide, chromia on alumina, mercuric oxide, antimony oxide, boric oxide and the like. Zinc chromite and mercuric chromite are illustrative of the metal chromites.

While the reactants can be provided in a mole ratio range of formaldehyde to hydrogen fluoride from about 1:0.5 to 1:50, it is preferred to employ stoichiometric excesses of hydrogen fluoride. Thus, mole ratio ranges of formaldehyde to hydrogen fluoride from about 1:2 to 1:10 are preferably employed. The catalyst is provided in a mole ratio range of formaldehyde to catalyst from about 15:1 to 1:15.

The process of this invention can be carried out in suitable pressure equipment or in vapor phase fluorination apparatus. As previously discussed, the reaction is carried out at a temperature between about 100° and 650° C. When pressure equipment, i.e., an autoclave is employed, a reaction temperature between about 100° and 400° C. is generally employed, while temperatures between 225° to 650° C. are preferred where vapor phase fluorination apparatus is utilized. After the completion of the reaction, the gaseous products are isolated by conventional techniques. Thus, passage through a hydrogen fluoride scrubber (e.g., sodium fluoride) removes unreacted or excess hydrogen fluoride. The organic products are then separated from the crude gaseous reaction mixture by condensation in a cooled, evacuated container. High vacuum techniques and vapor phase chromatography are employed to isolate the product. A mixture of methyl fluoride and methylene fluoride is generally obtained, although it has been found that certain catalysts, such as aluminum fluoride, favor the production of methyl fluoride.

While satisfactory yields are obtained in the process of this invention, it is commercially significant to note that the vapor phase fluorination apparatus is adaptable to a continuous process wherein the unreacted hydrogen fluoride is recycled, thereby providing higher yields than in a batch process operation.

The partially fluorinated methanes provided by the process of this invention are particularly useful in the field of low-temperature refrigerants. Methylene fluoride is a well-known commercially available refrigerant, while methyl fluoride is a valuable intermediate in the preparation of chlorinated fluorocarbons, such as dichloromonofluoromethane, which has industrial applications as a refrigerant and as a blowing agent.

The following examples will serve to illustrate the practice of this invention.

Example 1

A 300 ml. micro-monel rocking autoclave was purged with nitrogen and cooled to −78° C. Thirty grams (1.0 mole) of pure trioxane, 50.0 g. (2.5 moles) of anhydrous hydrogen fluoride and 50.0 g. (0.59 mole) of aluminum fluoride were charged to the autoclave. The sealed autoclave was heated at 152° C. for 6 hours, during which period a maximum pressure of 250 p.s.i.g. was observed. The autoclave was cooled to room temperature, and then attached by means of a special adapter to an evacuated copper vacuum line equipped with a hydrogen fluoride scrubber. Volatile gases were passed from the autoclave through the scrubber and then collected in a stainless steel cylinder cooled with liquid nitrogen in order to separate the condensible gases from the non-condensible gases such as, for example, carbon monoxide, nitrogen, etc. Seven g. of condensible organic gases were collected in the cylinder.

A 1 cc. sample of the collected gases was then analyzed by vapor phase chromatography on a Perkin-Elmer model 154C Vapor Fractometer under the following conditions:

Column: Teflon—¼″ by 4 m.
Packing: 50 percent KEL-F-1 on 35–65 mesh KEL-F-300
Temperature: 24.5° C.
Pressure: 5 p.s.i.g. (He)

A peak at a retention time of 51 mm. indicated that methyl fluoride had been obtained. The analysis also revealed that the sample contained 69.6 mole percent of methyl fluoride.

Infrared analysis (15 in. pressure) of the sample employing a 5 cm. cell with AgCl windows showed a characteristic methyl fluoride band at $9.56\mu$.

Mass spectral analysis showed the presence of a molecular ion at m/e 34, confirming the vapor phase chromatographic and infrared analysis by indicating that methyl fluoride having a molecular weight of 34 had been obtained. Yield: 20.6%.

Example 2

Following the procedure of Example 1, 2.5 moles of hydrogen fluoride were reacted with 1.0 mole of trioxane in the presence of 0.5 mole of aluminum fluoride. The reactants were heated at 250° C. for six hours; a maximum pressure of 400 p.s.i.g. was observed. Five grams of condensible gases were collected.

Vapor phase chromatographic analysis under the same conditions as Example 1 showed a peak at a retention time of 51 mm., indicating the presence of methyl fluoride. The analysis also determined that the sample contained 89.7 moles percent of methyl fluoride. Infrared analysis (21.4 in. pressure) showed a characteristic methyl fluoride band at $9.56\mu$. An m/e of 34 corresponding to a molecular weight of 34 for methyl fluoride was obtained when a sample was analyzed by mass spectroscopy, thereby confirming the above data. Yield: 13.2%.

Example 3

One mole of paraformaldehyde was reacted with 6.0 moles of hydrogen fluoride in the presence of 1.0 mole of fluorosulfonic acid, following the procedure of Example 1. The rectants were heated at 100° C. for 4 hours, and the condensible gases collected and analyzed.

Infrared analysis showed a methyl fluoride band at $9.56\mu$ and a methylene fluoride band at $9.08\mu$.

Mass spectral analysis showed the presence of molecular ions at m/e 51 and m/e 52, indicative of methylene fluoride having a molecular weight of 52, and at m/e 34 corresponding to methyl fluoride.

Example 4

Following the procedure of Example 1, 1.0 mole of trioxane was reacted with 2.0 moles of hydrogen fluoride in the presence of 1.0 mole of monofluorophosphoric acid at a temperature of 150° C. for 6 hours. A maximum pressure of 160 p.s.i.g. was observed.

Infrared analysis (10 in. pressure) showed a characteristic methyl fluoride band at $9.56\mu$.

Mass spectral analysis confirmed the above analysis by showing a molecular ion at m/e 34, corresponding to methyl fluoride having a molecular weight of 34.

Example 5

Trioxane (0.30 mole) was reacted with hydrogen fluoride (1.5 moles) in the presence of boron trifluoride (0.27 mole) following the procedure of Example 1. The reactants were heated at 150° C. for 6 hours; a maximum pressure of 350 p.s.i.g. was observed.

Two grams of condensible gases were collected.

A sample of the collected gases was then analyzed using a Perkin-Elmer Model TC Vapor Fractometer under the following condition:

Column: Teflon—¼″ by 7 meters
Packing: 40 percent HCl114 on KEL-F-300
Temperature: 20° C.
Pressure: 15 p.s.i.g. (He)

A peak at a retention time of 56 mm. indicated that methyl fluoride had been obtained; a peak at 61 mm. revealed the presence of methylene fluoride.

Infrared analysis (5 in. pressure) showed a methyl fluoride band at $9.56\mu$ and a methylene fluoride band at $9.08\mu$.

Mass spectral analysis revealed the presence of molecular ions at m/e 51 and m/e 52, corresponding to methylene fluoride, and m/e 34, corresponding to methyl fluoride. The analysis indicated that the collected gases contained 25 mole percent methylene fluoride and 34 mole percent methyl fluoride. Yield: 9.2% methyl fluoride; 4.2% methylene fluoride.

Example 6

Following the procedure of Example 1, 0.30 mole of trioxane were reacted with 1.5 moles of hydrogen fluoride in the presence of 0.03 mole of boron trifluoride. The reactants were heated at 150° C. for 5 hours, and a maximum pressure of 350 p.s.i.g. was observed. The collected gases weighed 3.0 grams.

Infrared analysis (5 in. pressure) revealed a methyl fluoride band at $9.56\mu$.

Mass spectral analysis showed the presence of methyl fluoride (76 moles percent) at m/e 34. Yield: 22.0%.

Example 7

Following the procedure of Example 1, 0.30 mole of trioxane were reacted with 2.0 moles of hydrogen fluoride in the presence of 0.3 mole of cesium fluoride. The reactants were heated at 150° C. for six hours, during which time a maximum pressure of 150 p.s.i.g. was observed.

Vapor phase chromatographic analysis under the same conditions as Example 5 showed a peak at a retention time of 56 mm., revealing the presence of methyl fluoride.

Infrared analysis (6 in. pressure) showed the characteristic methyl fluoride band at $9.58\mu$.

Example 8

A Fluorojet vapor phase fluorination apparatus fabricated from a silver soldered copper tube having an overall length of 30 inches and an ID of 1 inch was connected to an evacuated copper vacuum line equipped with a hydrogen fluoride scrubber. Aluminum fluoride (0.18 mole) was placed in an adaptor connected to the bottom of the tube. A solution of trioxane (3.0 moles) in hydrogen fluoride (1.50 moles) was prepared and charged to a dry, nitrogen-purged cylinder. The reaction zone of the Fluorojet apparatus was heated to 400° C. and the solution of reactants added dropwise at the base of the reactor. The reactants vaporized, passed through the catalyst bed, the reaction zone, the scrubber, and the gaseous reaction mixture was separated in a stainless steel cylinder similar to the procedure followed in Example 1. A residence time of 10.5 sec. was calculated. After 55 minutes 4.0 grams of crude product were collected.

The infrared spectrum (10 in. pressure) exhibited a characteristic methyl fluoride band at $9.56\mu$ and a methylene fluoride band at $9.08\mu$.

Example 9

A Fluorojet vapor phase fluorination apparatus constructed from a nickel tube having an ID of ¾ inch, a length of 24 inches, and a wall thickness of ⅛ inch was connected to an evacuated copper vacuum line as described in Example 8. Boron trifluoride (1.04 moles) was employed as the catalyst. The reaction zone was heated to 300° C. and a solution of trioxane (0.11 mole) in hydrogen fluoride (0.42 mole) was added dropwise at the base of the reactor. The calculated residence time was 6.3 seconds. After heating for 31 minutes, 1.0 gram of condensed crude product was collected.

Infrared analysis (3 in. pressure) showed a methylene fluoride band at 9.08μ and a methyl fluoride band at 9.56μ.

Mass spectral analysis indicated that the condensed gases contained 66 mole percent of methyl fluoride and 17 mole percent of methylene fluoride. Yeld: 18.2% methyl fluoride; 2.7% methylene fluoride.

Example 10

Following the procedure and utilizing the apparatus of Example 8, a solution of 0.30 mole of trioxane in 1.50 moles of hydrogen fluoride was passed through a catalyst bed comprising 34.0 grams of alumina and then through a reaction zone heated to 500° C. A residence time of 10.7 seconds was calculated. After 65 minutes two grams of crude product were collected.

The infrared spectrum (4 in. pressure) revealed a characteristic methyl fluoride band at 9.56μ.

A sample of the collected gases was then analyzed using a Perkin-Elmer Model TC Vapor Fractometer under the conditions described in Example 5. A peak at a retention time of 56 mm. indicated that methyl fluoride had been obtained.

Mass spectral analysis revealed the presence of a molecular ion at m/e 34, corresponding to methyl fluoride having a molecular weight of 34.

Example 11

Following the procedure and employing the apparatus of Example 8, a solution of 0.30 mole of trioxane in 1.50 moles of hydrogen fluoride was passed through a catalyst bed comprising 30.8 grams of zinc chromite and then through a reaction zone heated to 500° C. The residence time was 12.3 seconds. After 75 minutes, 1.5 grams of crude product was collected.

A sample was analyzed by vapor phase chromatography following the procedure of Example 5. A retention time of 56 mm. revealed the presence of methyl fluoride.

Example 12

Following the procedure and using the apparatus of Example 8, a solution of 0.30 mole of trioxane in 1.50 moles of hydrogen fluoride was passed through 25.0 grams of chromia on alumina into a reaction zone heated to 500° C. A residence time of 10.5 seconds was calculated. After 64 minutes, crude product was isolated.

Infrared analysis (4 in. pressure) revealed a characteristic methyl fluoride band at 9.56μ.

What is claimed is:

1. A process for preparing methyl fluoride and methylene fluoride which comprises reacting formaldehyde and hydrogen fluoride at a temperature between about 100° C. and 650° C. in the presence of a catalyst selected from the group consisting of fluorosulfonic acid, monofluorophosphoric acid, difluorophosphoric acid, alkali metal fluorides, chromium trifluoride, mercurous fluoride, mercuric fluoride, aluminum fluoride, boron trifluoride, gallium trifluoride, antimony trifluoride, antimony pentafluoride, antimony chlorofluoride, chromium oxyfluoride, argentous fluoride, argentic fluoride, cobaltic fluoride, lead oxide, lead dioxide, alumina, chromium oxide, chromia on alumina, mercuric oxide, antimony oxide, boric oxide, zinc chromite and mercuric chromite.

2. The process of claim 1 in which methyl fluoride is provided by employing aluminum fluoride as the metal fluoride.

3. The process of claim 1 in which methyl fluoride and methylene fluoride are provided by employing boron trifluoride as the metal fluoride.

4. The process of claim 1 in which the reaction is carried out in pressure equipment at a temperature between about 100° C. and 400° C.

5. The process of claim 1 in which the reaction is carried out in vapor phase fluorination apparatus at a temperature between about 225° and 650° C.

References Cited

Olah: Chemical Abstracts 49, 2384 (1955).

DANIEL D. HORWITZ, *Primary Examiner.*